Aug. 29, 1961  J. D. VAN PUTTEN, JR., ET AL  2,997,913
PROOF PLATE FOR FRINGE COMPARATOR
Filed July 22, 1957  3 Sheets-Sheet 1

INVENTOR.
John F. Donnelly
James D. Van Putten Jr.
BY
Price and Heneveld
ATTORNEYS Aug. 29, 1961   J. D. VAN PUTTEN, JR., ET AL   2,997,913
PROOF PLATE FOR FRINGE COMPARATOR
Filed July 22, 1957   3 Sheets-Sheet 2

INVENTOR.
John F. Donnelly
James D. Van Putten
BY
Price and Heneveld
ATTORNEYS

Aug. 29, 1961  J. D. VAN PUTTEN, JR., ET AL  2,997,913
PROOF PLATE FOR FRINGE COMPARATOR

Filed July 22, 1957  3 Sheets-Sheet 3

INVENTOR.
John F. Donnelly
James D. Van Putten Jr.
BY
Price and Heneveld
ATTORNEYS

2,997,913
PROOF PLATE FOR FRINGE COMPARATOR

James D. van Putten, Jr., and John F. Donnelly, Holland, Mich., assignors to Donnelly Mirrors, Inc., a corporation of Michigan
Filed July 22, 1957, Ser. No. 673,489
2 Claims. (Cl. 88—14)

This invention relates to a proof plate for testing the flatness or curvature of a glass plate by means of forming interference patterns produced by reflecting light rays from the adjacent surfaces of the glass plate and proof plate.

Proof plates for determining the curvatures of glass plates are old. Newton discovered that when a slightly curved plate is placed on a plate having a flat surface, and light was reflected off these surfaces, the reflected light would form patterns constituting interference fringes or rings. This phenomena is disclosed in more detail in the text "Prism and Lens Making" by F. Twyman, editon 1952, pages 275–383.

A conventional method of testing the flatness of glass plates by this and other improved methods is to put the glass plate to be tested directly on the proof plate. It is important when these two surfaces are put together that they are thoroughly clean because otherwise the test is inaccurate and furthermore dust or other particles scratch the surfaces, completely ruining them. Care also has to be taken to avoid prolonged handling of the glass plates because the heat from the body causes distortion of the surface. Therefore, judging them immediately after such handling adversely effects the quality of the test. In testing thin plates, the glass is placed directly upon the surface of the proof plate and tapped. This results in a partial vacuum being formed between the glass and the proof plate, causing the thin glass to conform to the surface of the optical flat surface and giving a false reading.

An object of this invention is to eliminate these inherent disadvantages of placing glass plates directly on the proof plate.

Still another object of this invention is to provide a novel proof plate or optical flat for use in fringe comparators.

Another object of this invention is to provide a proof plate or optical flat for use in fringe comparators, such plate preventing injury to the plate glass by scratching and also producing more accurate determination of the flatness of the plate.

Other objects of my invention will become obvious upon reading the following specification in conjunction with the accompanying drawings wherein.

Figures 1, 6, 14:
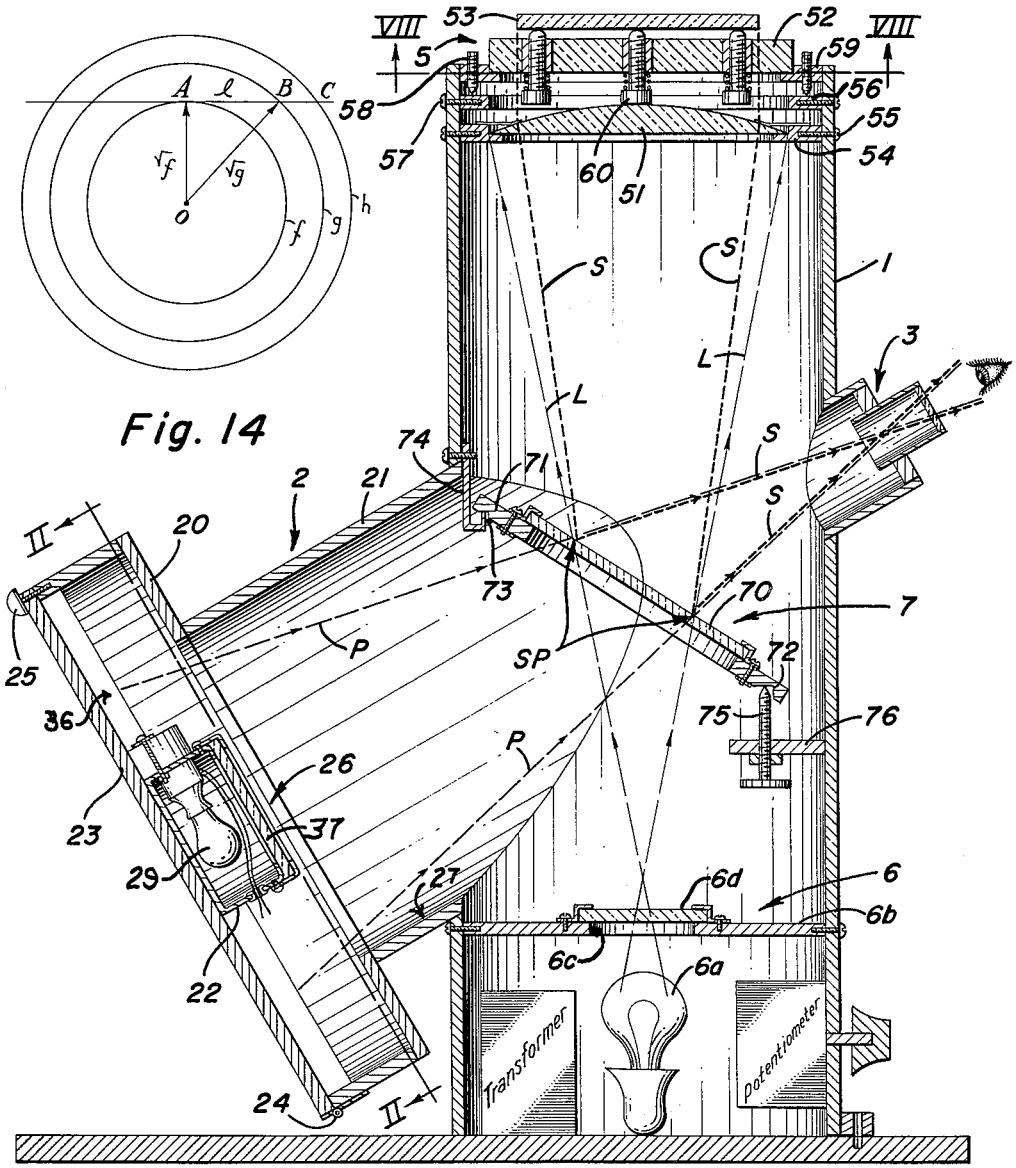
FIG. 1 is a side elevational, sectional, schematic view of the apparatus.
FIG. 6 is a plan view of a reticle plate.
FIG. 14 is a representation of an interference pattern shown for purposes of explaining a formula.
Figure 2:
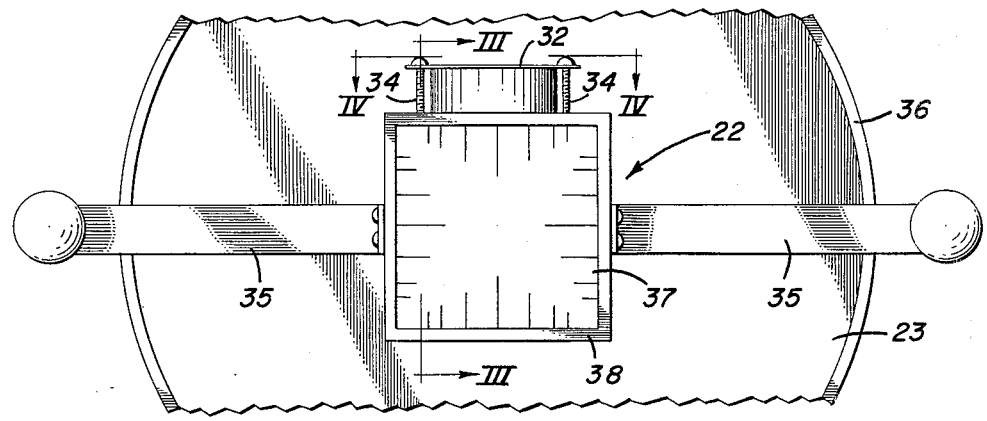
FIG. 2 is a fragmentary, cross sectional view taken along the plane II—II of FIG. 1 and showing the reticle assembly.
Figure 3:
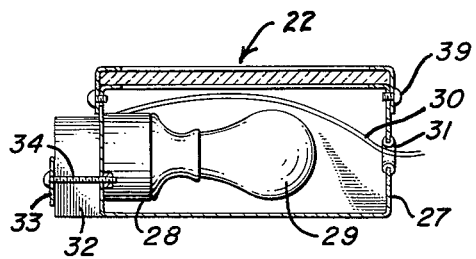
FIG. 3 is a cross sectional, elevational view taken along the plane III—III of FIG. 2.
Figure 4:
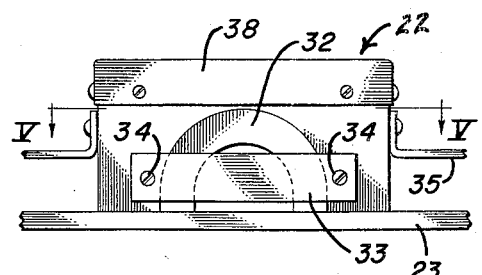
FIG. 4 is a partial, elevational view of the reticle assembly looking at the assembly in the direction indicated by the arrows IV—IV of FIG. 2.
Figure 5:
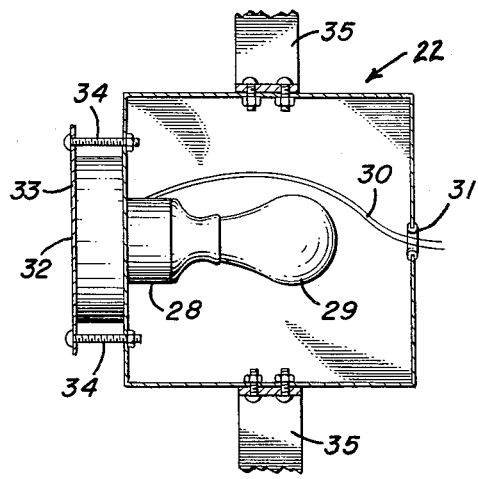
FIG. 5 is a cross sectional, plan view of the reticle assembly taken along the plane V—V of FIG. 4.

Briefly this invention relates to proof plate for testing the flatness of the glass plate by means of forming interference patterns produced by reflecting light rays from the surfaces of the plates. The plate of this invention is a solid plate of transparent material preferably glass or quartz having a ground and polished flat upper surface. This solid plate body has a plurality of elements inset in the material and protruding from the polished surface for supporting a glass plate above it. The preferred form of this invention comprises three equally spaced one-point contact elements suspending the glass plate above the optical flat. The particular preferred construction of these adjustable support elements is holes filled with a suitable material which is tapped for receiving an adjustable set screw. A spring is provided to prevent disadjustment of the screw by vibration or otherwise.

The optical plate of this invention, in order to explain its function, will be described in conjunction with apparatus forming a part of my copending application entitled "Fringe Comparator," Serial Number 673,208, filed July 22, 1957.

Referring to the drawings, reference numeral 1 denotes an elongated vertical housing circular in cross section and having an open top end. Inclined to the axis of the housing 1 is a reticle housing 2. An eye piece 3 is located diametrically opposite to the housing 2 and approximately concentric therewith. A mounting assembly 4 is located in the open top end of the housing 1. At the lower end is a light source assembly 6. A mirror assembly 7 is mounted between the mounting assembly 4 and light source assembly and also between the reticle housing 2 and eye piece 3. As will be explained in more detail hereinafter, the flatness of a glass plate properly mounted in the open top end of the housing can be determined by observing and comparing the images of an interference pattern and a reticle produced on the mirror.

The reticle housing assembly 2 includes the reticle housing 20 mounted on the end of the cowling 21. The housing 20 and cowling 21, both of circular cross section, have aligned openings 26 and 27 concentric with the opening in the side of housing 1 in which the cowling is mounted. The housing 20 is open at the end opposite the cowling, which end is closed by the plate 23 constructed of a magnetic permeable material for the purpose hereinafter described. The plate 23 is hinged to the housing 20 by the hinge 24 and is latched at its upper side by the catch 25.

The reticle assembly 22 is located on the plate 23 so that it is in alignment and in focus with the eye piece 3.

FIGS. 2–5 show in more detail the construction of the reticle housing 22. This housing includes a square box 27 having mounted therein the lamp socket 28 supporting the lamp 29. The wires 30 lead from socket 28 through the opening 31 of the box to a source of power (not shown).

A U-shaped magnet 32 is secured to one side of the housing 7 by the plates 33 and tie bolts 34. The ends of the magnet contact the plate 23 constructed of magnetic permeable material so that the entire assembly is held in position by the magnet. Two arms 35 are secured to the sides of the box 27 and extend outwardly beyond the walls of the housing 20 through the slot 36. The magnet is sufficiently strong to hold the assembly 22 in any position on plate 23. However, it permits the assembly 22 to be slid on the plate 23 for adjusting the position of the reticle.

The reticle element 37 is mounted in the top of the box immediately above the light 29. It is secured to the box by the ring element 38, removably attached by screws 39. Thus the reticle element can be replaced by reticles calibrated for the desired radius of curvature as will be explained hereinafter.

The reticle 37 is a square glass piece approximately three inches square and ¼ inch thick. One side of the reticle is coated with an opaque material such as black lacquer which is suitable for scribing the lines B, $C_1$, $C_2$, $C_3$ along each edge. The spacing of these lines or marks depends upon the radius of curvature for which the reticle is calibrated. The opposite side of the reticle is frosted to reduce the glare of light shining through the scribed lines.

The spacing of the scribed lines of the reticle is determined by a formula derived from the following formula proved and developed in "Introduction To Theoretical And Experimental Optics" by Joseph Valasek, pages 129–133:

$$R = \frac{r_g^2 - r_f^2}{n\lambda}$$

wherein $r_f^2$=radius of one interference fringe in inches; $r_g$=radius of the next interference fringe in inches; $R$=radius of curvature of the glass producing the fringe in inches; $\lambda$=wave length of light=$2.32 \times 10^{-5}$ inches; and $n$=the number of rings evident from the ring of radius $r_f$ up to and including the ring of radius $r_g$ along any radial.

The calibration of the reticle 27 is based upon the above formula and the realization that the distance between fringes intercepted by a line tangent to any circular fringe is related to the difference between the squares of the radii of the two fringes.

Following the above formula $$\left( R = \frac{r_g^2 - r_f^2}{n\lambda} \right)$$

it is evident that the radius of curvature is dependent upon the spacing of the fringe lines. As a result of this relationship, the radius of curvature can be determined by the spacing between the points of intersection of a line drawn tangent to one of the fringe circles. FIG. 14 illustrates the mathematical means of deriving a radius of curvature formula based on the spacing between the points of intersection of a tangent line.

Each of the circles $f$, $g$ and $h$ represent a fringe line. Drawing a tangent to the fringe line $f$ at the point A, the points of intersection B and C are noted. Drawing the radial lines OA and OB forms a right angle triangle OAB. From this triangle the following relationship is evident: $r_g^2 = r_f^2 + l^2$. Therefore, $l = r_g^2 - r_f^2$. Substituting this in the above formula $$\left( R = \frac{r_g^2 - r_f^2}{n\lambda} \right)$$

$l$ becomes equal to $\sqrt{Rn\lambda}$.

The reticle markings on the lines are projected by light 29 onto the mirror 70 forming a part of the mirror assembly 7. The mirror 70 is a half reflection mirror. It will transmit light or shadows originating beneath it and reflects all lights or shadows originating above it. The mirror 70 is mounted in a frame 71 which has the two notches 72 and 73 on each side. The notch 73 receives a hook 74 secured to the housing 1. Therefore, the hook supports one side of the frame. The other notch 72 receives the screws 75 mounted on the support 76 projecting from the housing 1. The screw 75 are adjustable thus providing a means for adjusting the inclination of the frame and the mirror for properly aligning the images of the reticle and interference patterns.

The light source assembly 6 at the bottom of the housing comprises an ozone lamp which provides a monochromatic light source. The assembly also includes the transformer and potentiometer for controlling and adjusting the intensity of light source. Above the lamp 6a is a wall 6b having an opening 6c through which the light from the lamp 6a projects. Mounted in the opening 6c is the monochromatic light diffusor 6d provided to diffuse any light from the lamp particularly for masking the filament. The monochromatic light originating from the lamp 6a shines upwardly through the mirror 70 to the top end of the housing 1 where the lens 51, proof plate or optical flat 52 and a glass plate 53 are located.

The mounting assembly for the lens, proof plate and glass plate includes a first circular lens supporting ring 54 located at a slight distance from the top end of the housing 1 and secured to the housing by the screws 55. The ring 54 supports the lens which is a collimating lens for projecting the entire interference pattern produced by the glass plate 53 and proof plate 52 onto the mirror 70.

Above the ring 54 is a support ring 56 secured to the housing 1 by the screws 57. This ring provides the bearing support for the set screws 58 which are threaded into and support the proof plate support ring 59.

The proof plate or optical flat 52 rests on the support ring 59. It is a solid, circular, disc-like glass plate having a flat, polished side. This plate can be constructed of several different materials including quartz but glass is preferred.

Figure 7:
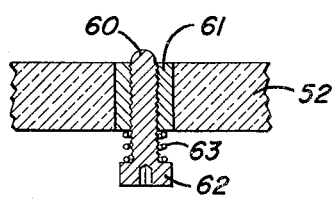
FIG. 7 is a partial, cross sectional, elevational view of a preferred construction for one of the support elements of the novel proof plate.
Figure 8:
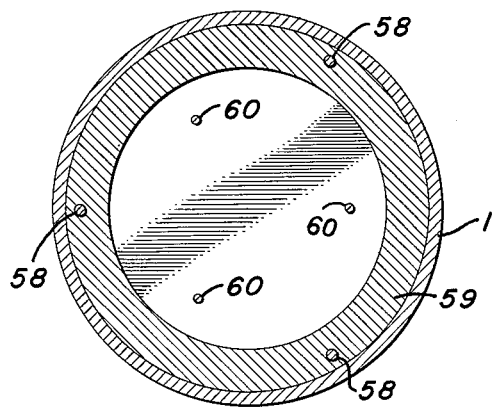
FIG. 8 is a sectional view taken along the plane VIII—VIII of FIG. 1, illustrating the structure of the proof plate.
Figure 10:
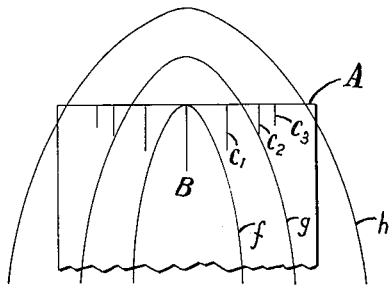
FIGS. 10, 11, 12 and 13 show various images of interference patterns superimposed on a reticle image for determining the radius of curvatures of glass plates.

The novelty of the flat 52 is the support elements 60 shown in detail in FIGS. 7 and 8. FIG. 7 shows the tapped plugs 65 mounted in the holes 61. The plugs receive the set screws 60 having an enlarged head 62 at one end and a spherical tip at the other end. The spherical ends provide a one-point contact support at three points. The points are preferably located ⅔ of the radius length from the center of the flat. This arrangement has proven to produce better interference patterns. Screws 60 are adjustably mounted in the plugs. The springs 63 juxtaposed between the bottom surface of the plate and head 62 are provided to prevent loosening and misadjustment due to vibrations and otherwise.

The set screws 60 provide an air wedge of .005 to .010 inch. Hence, the glass surface to be examined never directly contacts the optical flat. This has tremendous advantages as will be explained in "Operation."

Figure 9:
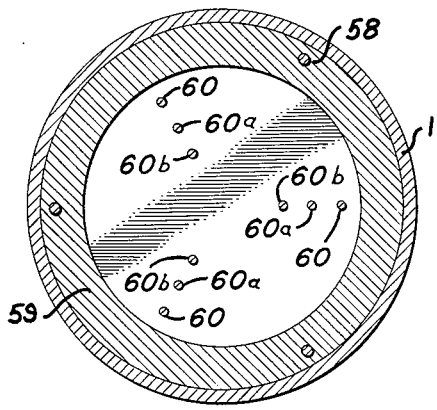
FIG. 9 is a modified arrangement of support elements of the proof plate, such elements being shown in the same cross sectional view of FIG. 8.

FIG. 9 discloses a modification adapted for testing various size plates. Three sets of screws 60, 60a and 60b are spaced equally about the center of the proof plate. With this modification several different sizes of plates can be supported at points ⅔ the radial distance from their centers, thereby producing good interference patterns for each of these plates. It should be understood that only one set screw 60, 60a or 60b is used at one time. The screws not used are then adjusted so that their ends are below the polished flat surface.

*Operation*

Having described the various structural details of the apparatus, its operation will now be described.

The image of the interference pattern is produced by projecting the monochromatic light through the mirror 70, the proof plate 52 and glass plate 53. The light rays projected from the lamp 6a are denoted by the letter L. The light reflected from the plate surfaces are denoted by the letter S. In FIG. 1 it is evident the light rays L project upwardly through the mirror and reflected rays S are projected on the mirror. The lens 51 produces patterns as illustrated in FIGS. 10–13. The shape of the interference pattern and the number of spacings of fringes is determined by the surface contour of the glass plate 53. FIGS. 10–13 show various patterns.

The rings $f$, $g$, $h$, etc. represent the various fringes or rings of interference patterns. These patterns are produced on the mirror 70 and are visible by looking through the eyepiece 3.

The image of the reticle 37 is also projected on the mirror 70 by the light 29. These projection lines or reticle emission are represented by the broken lines P. It is evident from the lines S and P and the points of superimposition SP that the image of the interference pattern is superimposed on the reticle 37.

This superimpostion of the two images is made possible by adjustment of the reticle or glass plate. When located in the positions shown the reticle and glass plate are in approximate position for superimposition of the two images. Adjustment of the reticle or glass plate, however, is always necessary in order to align one side of the reticle tangent to the fringe of greatest curvature. The reticle adjustment feature has been found to be the easiest and most acceptable because handling of the glass plate is undesirable. The specific adjustment means shown including the holding magnet 32 and handles 35 extending through slots in the housing 20 provides an especially acceptable and easy adjustment means.

The operation of this apparatus is simple and makes it possible to measure the radius of curvature accurately each time. First the particular reticle calibrated for a certain radius of curvature is selected and then inserted into the reticle box by removing the screws 39, replacing a properly calibrated reticle 37 and reinstalling frames 38 and screws 39. The reflecting mirror is then inserted and fixed into position. The screw 75 is adjusted until the light from the open top end of the housing 1 and the light through cowling 21 form two concentric circles on the mirror. This assures approximate superimposing of the reticle and pattern images.

The plate 23 is closed and lamps 29 and 61 are illuminated. The potentiometer is adjusted for the proper intensity of the ozone lamp.

Having installed lens 51, a sample piece of ¼″ polished plate glass having a radius of curvature of at least 375 feet is placed over the hole in the proof plate support ring 59. The three set screws 58 are then adjusted for a maximum image brightness.

The support screws 60 in the flat are adjusted to the approximate position above the surface of the flat. Then the proof plate is laid on the glass plate with the support elements pointing downwardly and contacting the top surface of the sample glass plate. It is desired to have a .005″ to .010″ air wedge between the glass plate and the proof plate. Therefore, the cap screws 60 are adjusted to provide this air wedge. This spacing can be determined by a certain degree turn of the set screws 60 depending on the pitch of the threads.

The glass plate and inverted proof plate produce an interference pattern visible through the eye piece 3. While viewing this pattern, the set screws 60 are adjusted until a bull's-eye is obtained near the edge of the proof plate.

The proof plate and the glass plate are then removed. The proof plate is then placed in the support 59 with the elements 60 pointing upwardly. The sample glass plate is laid on top of the screw elements 60 to check for a bull's-eye. If a bull's-eye is not visible an adjustment is made by removing the proof plate and the sample glass plate and repeating the above steps.

Assuming a bull's-eye is visible and having chosen a reticle calibrated to a radius of curvature which an acceptable glass plate to be tested must have, the plate to be tested is then placed on the set screws of the proof plate. The fringe of greatest curvature is then observed through the eyepiece 3. The position of the reticle box is adjusted until one of the sides of the reticle is tangent to the fringe of greatest curvature. FIGS. 10, 11, 12 and 13 show this relationship. If the fringe lines $f$, $g$ and $h$ cross the side A at $c_1$, $c_2$, and $c_3$, respectively, the radius of curvature is identical to that for which the reticle is calibrated. FIG. 13 shows such a pattern.

Figure 11:
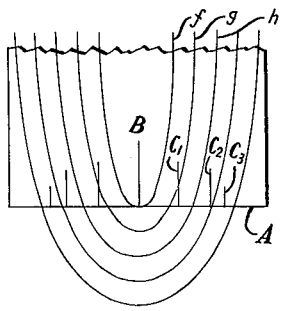
Figure 12:
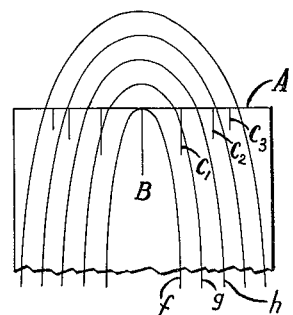
Figure 13:
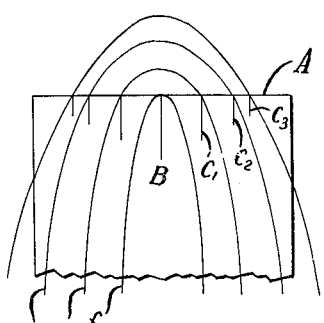

If conditions are such that the fringe $g$ crosses A between B and $c_1$, and fringe 1 crosses between B and $c_2$, etc., then the glass plate has a radius of curvature less than 500 feet (FIGS. 11 and 12). However, if the condition of FIG. 10 appears where the fringe line $g$ crosses the side or tangent line A between $c_1$ and $c_2$, etc., then the sample has a curvature greater than 500 feet.

As stated previously, reticles are calibrated for various radius of curvatures. Therefore, it is desired to test a glass plate for other curvatures such as 750 feet, the reticle calibrated for a radius of curvature of 750 feet is substituted for the 500 foot reticle. The entire procedure is then repeated.

The sides of the reticles are of given length. For example, two inches is preferred. As a result, this apparatus can be used by adjusting the reticle in such a position that the number of fringe lines can be counted within the two inch distance. Given this number of fringe lines, it is possible with certain formulas to determine the exact radius of curvature of the glass plate being tested.

An added feature of this instrument is that it is possible to tell whether a sample is convex or concave. The method of accomplishing this is to set the bull's-eye at the edge of the flat. Then slight pressure is applied on the sample. If the fringe is moved toward the bull's-eye then it is concave because the applying pressure makes the glass plate more concave.

Having described the optical flat and the apparatus with which it is used, it should become obvious that this invention has distinct advantages. Scratching of the glass plate by dirt or other particles is completely eliminated by the spacer elements 60. Further, the proper relationship between the glass plate and optical flat can be easily obtained with very little guess work. Therefore, suitable and accurate interference patterns are produced.

The proof plate eliminates distortion of the glass plate by reason of the creation of partial vacuums since possibilities of such vacuums are completely eliminated. The proof plate eliminates excessive handling of the glass plates. Its features speed up the testing procedure.

Having described our invention, it should be understood that although we have shown a preferred form, alterations and modifications are possible within the spirit of this invention. Therefore, this invention should only be limited as expressly provided by the language of the appended claims.

We claim:

1. A proof plate for testing the contour of a glass plate by measuring the interference patterns produced by light rays reflected from the surfaces of said plates when approximately parallel and contingent to each other comprising: a solid plate of transparent material having a ground and polished flat upper surface and a plurality of holes in said solid plate; a metallic material filling said holes; tapped holes in said material; and one-point contact support elements adjustably mounted in said tapped holes and having their points projecting from said polished surface for supporting a glass plate.

2. A proof plate for testing the contour of a glass plate by measuring intereference patterns produced by light rays reflected from the surfaces of said plates comprising: a solid plate of transparent material having a ground and polished flat upper surface and three holes in said solid plate equally spaced about a center point; a material filling said holes; tapped holes in said material; and one-point contact support elements adjustably mounted in said tapped holes and having their points projecting from said polished surface for supporting a glass plate.

References Cited in the file of this patent

UNITED STATES PATENTS

| | | |
|---|---|---|
| 1,154,819 | White | Sept. 28, 1915 |
| 1,756,785 | Gallasch | Apr. 29, 1930 |
| 2,450,839 | Merritt | Oct. 5, 1948 |

(Other references on following page)

| | UNITED STATES PATENTS | |
|---|---|---|
| 2,455,763 | Harrison | Dec. 7, 1948 |
| 2,718,811 | Riepert et al. | Sept. 27, 1955 |
| | FOREIGN PATENTS | |
| 602,459 | Great Britain | May 27, 1948 |

OTHER REFERENCES

Laurent: Pages 292, 293 in Zeitschrift fur Instrumentenkunde, August 1883.

Twyman: Prism and Lens Making, 2nd edition, 1952, pages 382, 383.